United States Patent
Curti et al.

(10) Patent No.: US 11,048,301 B2
(45) Date of Patent: Jun. 29, 2021

(54) MULTIPLE DISPLAYS MANAGEMENT IN BARCODE READING APPLICATIONS

(71) Applicant: Datalogic IP Tech S.r.l., Calderara di Reno (IT)

(72) Inventors: Chiara Curti, Bologna (IT); Mattia Piunti, Milan (IT); Davide Frascari, San Giovanni (IT); Cristian Broccoli, Bologna (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 0 days.

(21) Appl. No.: 16/246,304

(22) Filed: Jan. 11, 2019

(65) Prior Publication Data
US 2020/0225705 A1    Jul. 16, 2020

(51) Int. Cl.
*G06F 1/16* (2006.01)
*G06K 7/10* (2006.01)

(52) U.S. Cl.
CPC .......... *G06F 1/1647* (2013.01); *G06F 1/1626* (2013.01); *G06K 7/10881* (2013.01); *H04M 2250/16* (2013.01)

(58) Field of Classification Search
CPC . G06F 1/1647; G06F 1/1626; G06K 7/10881; H04M 2250/16
See application file for complete search history.

(56) References Cited

U.S. PATENT DOCUMENTS

| | | |
|---|---|---|
| 5,202,817 A | 4/1993 | Koenck et al. |
| 5,418,684 A | 5/1995 | Koenck et al. |
| 5,530,619 A | 6/1996 | Koenck et al. |
| 5,539,193 A | 7/1996 | Gibbs et al. |
| 5,539,194 A | 7/1996 | Miller et al. |
| 5,793,604 A | 8/1998 | Koenck et al. |
| 5,917,175 A | 6/1999 | Miller et al. |
| 6,244,512 B1 | 6/2001 | Koenck et al. |
| 7,421,602 B2 | 9/2008 | Sutardja |

(Continued)

FOREIGN PATENT DOCUMENTS

| | | |
|---|---|---|
| CA | 2214273 A1 | 2/1998 |
| CN | 101021766 A | 8/2007 |

(Continued)

OTHER PUBLICATIONS

Zebra TC51/TC56 Touch Computer Series, https://www.zebra.com/gb/en/products/mobile-computers/handheld/tc51-tc56.html, Dec. 21, 2018, 10 pages.

(Continued)

*Primary Examiner* — Kenneth B Lee, Jr.
(74) *Attorney, Agent, or Firm* — Foley & Lardner LLP

(57) ABSTRACT

A mobile electronic device may include a primary electronic display, a barcode scanner engine including an optical sensor configured to capture light reflected from a machine-readable indicia to be used in reading the machine-readable indicia, and a secondary electronic display positioned adjacent to the barcode scanner engine. A process for operation of the mobile device may include operating the barcode scanner engine of the mobile electronic device. The secondary electronic display may be operated. In response to the primary electronic display being unlocked or transitioned to an ON state, the secondary electronic display may be transitioned to an OFF state.

20 Claims, 9 Drawing Sheets

(56) References Cited

U.S. PATENT DOCUMENTS

| | | |
|---|---|---|
| 8,023,975 B2 * | 9/2011 | Wickman ............... H04M 1/57 |
| | | 455/466 |
| 8,073,493 B2 | 12/2011 | Tseng |
| 8,108,782 B2 | 1/2012 | Rajpal et al. |
| 8,976,141 B2 | 3/2015 | Myers et al. |
| 9,264,428 B1 * | 2/2016 | Maroney ............ G06Q 30/0629 |
| 9,268,367 B2 | 2/2016 | Aguera y Arcas et al. |
| 9,269,036 B2 | 2/2016 | Bremer |
| 9,351,334 B1 | 5/2016 | Kotab |
| 9,697,405 B2 | 7/2017 | Bremer |
| 2004/0248550 A1 * | 12/2004 | Hausner ................ H04L 63/08 |
| | | 455/410 |
| 2014/0002365 A1 | 1/2014 | Ackley et al. |
| 2014/0132481 A1 | 5/2014 | Bell et al. |
| 2017/0139485 A1 | 5/2017 | Fogelmark et al. |
| 2017/0228682 A1 | 8/2017 | Nilsson et al. |
| 2017/0343355 A1 | 11/2017 | Tengfjord et al. |

FOREIGN PATENT DOCUMENTS

| | | |
|---|---|---|
| CN | 204967910 U | 1/2016 |
| WO | WO-92/10803 A1 | 6/1992 |
| WO | 2018225100 A1 | 12/2018 |

OTHER PUBLICATIONS

European Search Report corresponding to European Patent Application No. 20150571.6, dated Feb. 21, 2020, 9 pages.

* cited by examiner

FIG. 1B (TOP VIEW)

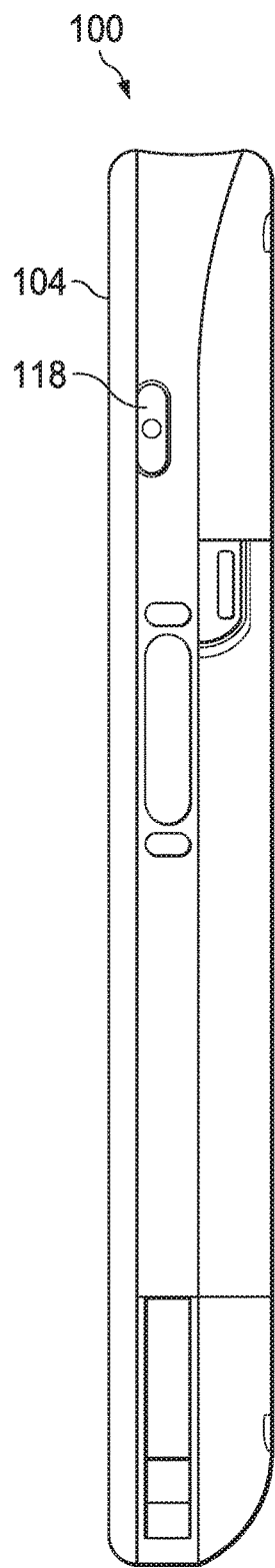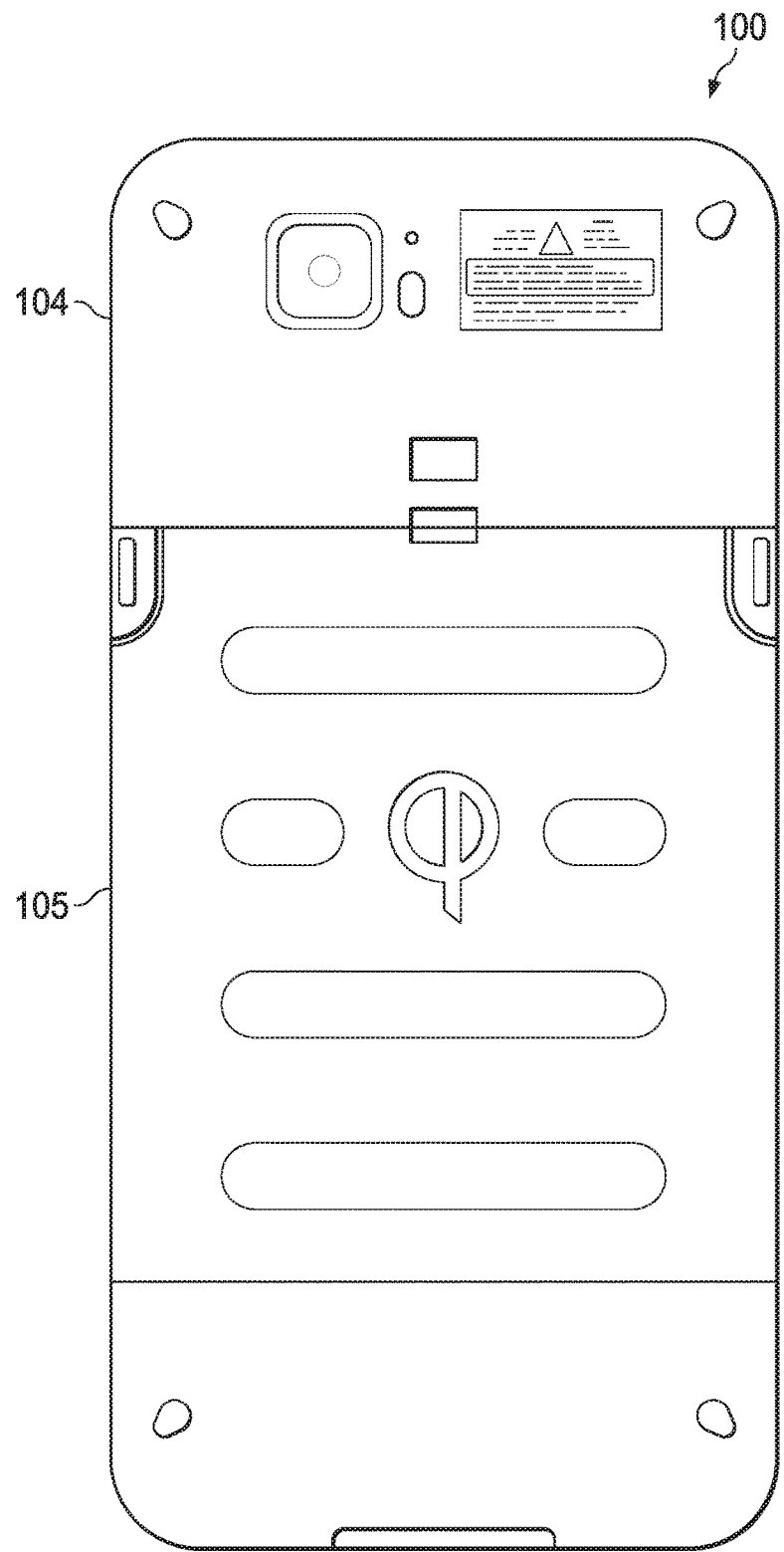
FIG. 1D
FIG. 1E

MULTIPLE DISPLAYS MANAGEMENT IN BARCODE READING APPLICATIONS

BACKGROUND

Mobile electronics devices or mobile devices, such as smartphones, application specific mobile devices, and so on, have become pervasive in society. While mobile devices have become widely accepted for consumer use, so too has the use of mobile devices in a wide range of commercial, industrial, and military functions. One of the many benefits that mobile devices provides is the wide range of applications supported by the mobile devices as a result of different types of hardware that are able to be supported by the mobile devices. For example, by the inclusion of a camera and global positioning system (GPS) with mobile devices, images may be captured and tagged with location of capture when performing home inspections, car damage appraisal, and many other use cases so as to be used for insurance adjustments for homes and cars when used by inspectors. Other uses, such as barcode scanning, may be performed as a result of barcode scanner engines being integrated into mobile devices assist a user with scanning barcodes, such as when scanning vehicles by car rental company employees, scanning parts for inventory collection and quality inspections, and otherwise.

A primary function of mobile devices is the ability to provide communications and text messaging capabilities to workers, especially those working in logistics capacities. Not only is a conventional telephone talk function helpful to employees, but also text messaging is helpful for sending and sharing information to and with the employees. Although the use of mobile devices with text functionality is helpful, there are inefficiencies that can occur if a user has to look at a primary electronic display of the mobile device each time a text message is received.

SUMMARY

To improve the functionality of mobile devices used in commercial, industrial, military applications, a mobile device may include a secondary electronic display and a barcode scanner engine. In an embodiment, the barcode scanner engine and the secondary electronic display may be positioned adjacent to one another on a top surface of the mobile electronic device to make operating the barcode scanner engine easier and support the functionality of messaging access without having to remove the mobile device from a belt holder.

Because the barcode scanner engine may use a laser or other bright illumination device to perform scanning, the mobile device may be configured to prevent simultaneous operation of the barcode scanner engine and secondary display so as to prevent eye injury as a user of the mobile device will look at secondary electronic display repeatedly throughout the day. To further prevent potential eye injury mishap, the mobile device may be configured to turn the secondary electronic display to an OFF state if the primary electronic display is in an ON state. Moreover, the mobile electronic device may be configured to prevent the barcode scanner engine from being in in ON state without the primary electronic display being in an OFF state as a primary electronic display may have controls for the barcode reader engine being displayed during setup and operation. These controls and other safety features may reduce or eliminate the ability for a user to have an accidental injury as a result of the barcode scanner engine illuminating a laser beam into an eye of the user of the mobile electronic device.

One embodiment of a mobile electronic device may include a primary electronic display, a barcode scanner engine including an optical sensor configured to capture light reflected from a machine-readable indicia to be used in reading the machine-readable indicia, and a secondary electronic display positioned adjacent to the barcode scanner engine.

One embodiment of a process for operation of a mobile device may include operating a barcode scanner engine of a mobile electronic device that includes a primary electronic display. A secondary electronic display positioned adjacent to the barcode scanner engine may be operated. In response to the primary electronic display being unlocked or transitioned to an ON state, the secondary electronic display may be transitioned to an OFF state.

Another embodiment of a process may include operating a secondary electronic display of a mobile device that includes a machine-readable indicia scanner engine and a primary electronic display. A machine-readable indicia scanner engine may be operated by the mobile device. In response to the machine-readable indicia scanner engine being transitioned to an ON state, the secondary electronic display may be caused to be in an OFF state.

BRIEF DESCRIPTION OF THE DRAWINGS

Illustrative embodiments of the present invention are described in detail below with reference to the attached drawing figures, which are incorporated by reference herein and wherein:

FIG. 1A-1E are illustrations of an illustrative mobile electronic device including a primary display and a secondary display and barcode scanner engine positioned adjacent to one another on a top surface of the mobile electronic device;

DETAILED DESCRIPTION OF THE DRAWINGS

Figure 1A:
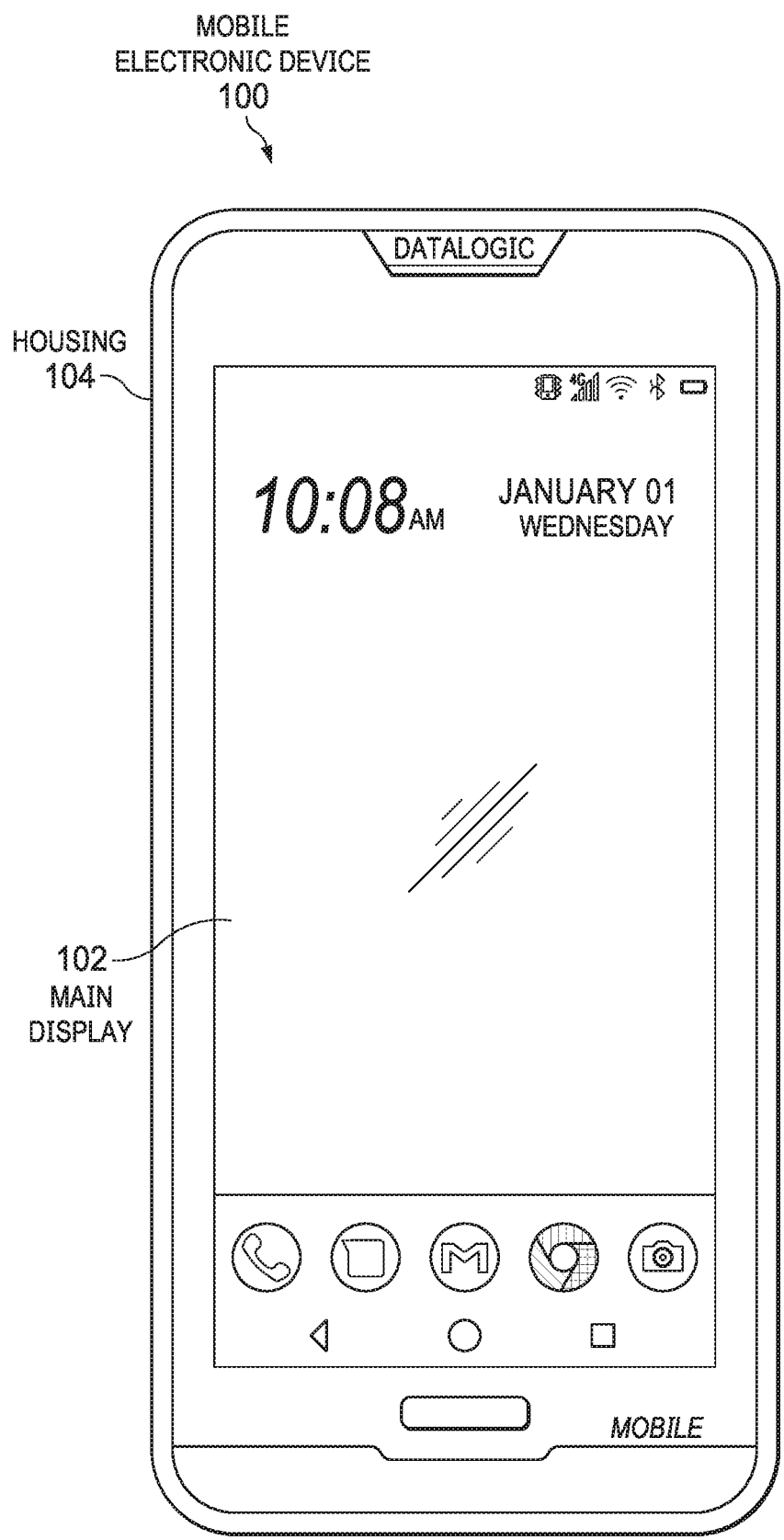

With regard to FIG. 1A, an illustration of an illustrative mobile electronic device 100 including a main or primary display 102 is shown. The mobile electric device 100 may further include a housing 104 in which the primary electronic display 102 is positioned along with electronics (not shown) for use in operating the mobile electronic device 100 to perform conventional functions of mobile electronic devices and support advanced features, such as those shown in FIG. 1B.

With regard to FIG. 1B, an illustration of a top view of the mobile electronic device 100 is shown to include a secondary display 106 positioned adjacent to a barcode or machine-readable indicia scanner engine or scan engine 108 that are both affixed to a top portion of the housing 104. The secondary display 106 may be an e-ink or other low-power consumption electronic display device. The secondary display 106 is shown to be displaying text 110, such as a text message from a messaging app or other notification message. It should be understood that in an alternative embodiment that other information and data format, including graphics, images, and/or any other content capable of being displayed on the secondary electronic display may be performed. The barcode scanner engine 108 may include an optical sensor 112 configured to sense optical data reflected from a machine-readable indicia, such as a barcode, QR code, alphanumeric text, and/or any other machine-readable indicia format.

The scanner engine 108 may further include a laser element (e.g., laser diode) 114 for use in scanning a machine-readable indicia, as understood in the art. The use of a laser element 114 can be problematic for users as inadvertent illumination of an eye by the laser element 114 may cause eye damage. For typical uses of the mobile electronic device 100, users will naturally look at the secondary display 106 for information being displayed thereon. As a result, additional safety precautions and processes to avoid a user having a laser beam from the laser element 114 enter a user's eye directly is to be taken, as further described hereinbelow. In an embodiment, the mobile electronic device 100 may be configured to communicate and display a preview of background app notifications on the secondary display 106, which enables the user to see the notifications (i) without having to remove the mobile electronic device 100 from his or her belt holster or pocket, and (ii) without having be concerned that the laser element 114 could be mistakenly left in an ON state.

Moreover, because the scanner engine 108 is disposed adjacent to the second electronic display 106, particular safety measures as to when scanner engine 108 is turned ON (i.e., in an ON state) versus when the secondary electronic display 106 is turned ON is accounted for to avoid risking eye injury to a user, as further described hereinbelow. Although not shown, it is possible to include a mechanical component (e.g., slide cover) that allows for one or the other of the secondary electronic display 106 or scanner engine 108 to be physically covered so as to prevent a user from viewing both of the devices simultaneously. In an embodiment, the cover could be spring-loaded and defaults to cover the barcode scanner engine 108. An electro-mechanical device may additionally or alternatively be controllable by the mobile electronic device 100 such that the barcode scanner engine 108 is uncovered when selected to be used by the user. Still yet, if the cover is physically moved to uncover the barcode scanner engine 108, the mobile electronic device 100 may automatically turn ON the primary display 102 to enable the user to perform scanning of machine-readable indicia.

Figure 1C:
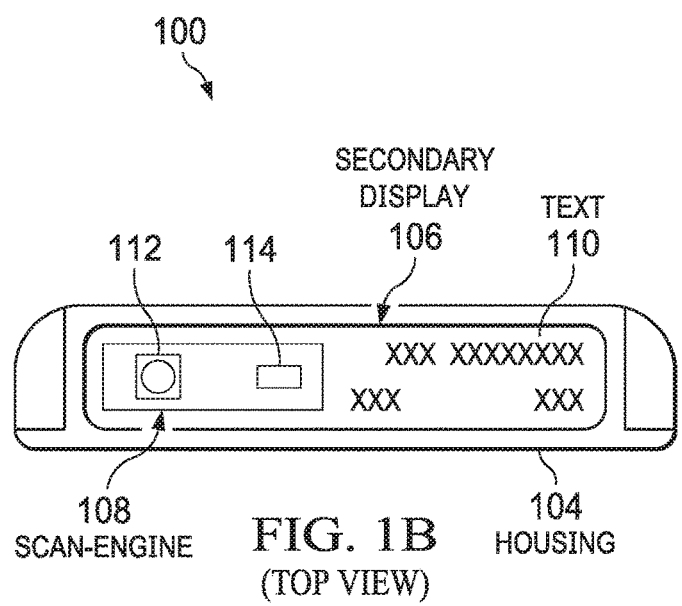
Figure 1C:
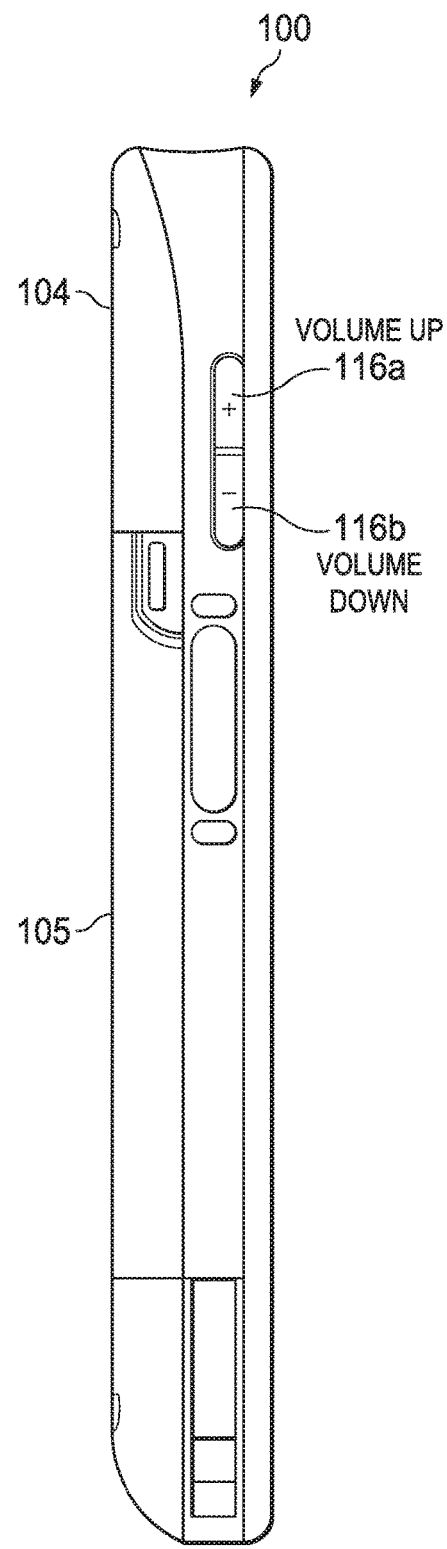

With regard to FIG. 1C, a left side view of the mobile electronic device 100 is shown to include the housing 104, battery pack 105, and user-interface buttons 116a and 116b (collectively 116), in this case volume up and down buttons, that the user may operate (i) in a conventional mobile electronic device mode to adjust volume, but, (i) in a mode when the secondary electronic display 106 is being utilized, to enable the user to scroll through successive available to be message be displayed on the secondary electronic display 106. In an embodiment, pressing the user-interface button (e.g., volume up button) 116a may enable the user to scroll forward through the messages in an ascending, time-sequential order, and pressing the user-interface button (e.g., volume down button) 116b may enable the user to scroll through the messages in a descending, time-sequential order. The use of these particular user-interface buttons is illustrative and may have alternative control functionality with regard to the secondary electronic display 106, as well. For example, the user-interface button(s) 116 may turn ON a light, adjust brightness, change color, extend duration of time that a message is displayed or a light of the secondary electronic display 106 remains ON, and so on. The user-interface buttons 116 may also provide for certain control over the scan engine 108, such as enable and disable, time of scan before automatic transition to an OFF state, and so on. Further description of processes for the use of the user-interface elements is provided herein with regard to FIGS. 7 and 8.

Setup of parameters of the secondary electronic display 106 and/or scan engine 108 may be performed in conjunction with the secondary electronic display 106 or primary electronic display 102. However, the setup of the functionality of the secondary electronic display 106 and/or scan engine 108 may be easier or more intuitive while looking at the secondary electronic display 106. In the event that the user is performing a setup of the laser element via the secondary electronic display 106, the laser element 114 is to be maintained in an OFF state. If operational parameters of the laser element 114 are being set up and would benefit from the laser element 114 being turned ON, then such a setup operation is to be performed on the primary electronic display 102.

With regard to FIG. 1D, a right side view of the mobile electronic device 100 is shown to include the housing 104. A power button 118 of the mobile electronic device 100 may be used for swapping operational modes of the secondary electronic display 106 (e.g., enable/disable, display of all app messages or just messages related to the user of the scanner engine 108, etc.) or sorting through messages displayed on the secondary electronic display 106. It should be understood that any number of user-controlled elements, such as the user-interface elements 116, power button 118, or otherwise, may be utilized to control mode an operation of the secondary electronic display 106 and/or scan engine 108. For example, the user may double press the power button 118 to cause the scan engine 108 to turn ON and perform a machine-readable indicia scan. Alternatively, pressing and holding one of the user-interface elements 116 for a certain time period (e.g., 3 seconds) may cause the scan engine 108 to turn ON and remain ON while the user holds down the button.

With regard to FIG. 1E, an illustration of a rear view of the mobile electronic device 100 is shown to include a rear of the housing 104. The housing 104 may be integrated as part of the mobile electronic device 100. Alternatively, the housing 104 may be a temporary housing that is configured to be removable from the mobile electronic device 100. In the event of the housing 104 being removable, an electrical port (not shown) that interfaces with a standard electrical port of the mobile electronic device 100 may be utilized. Otherwise, the secondary electronic display 106 and scanner engine 108 may be integrated into a communications bus of the mobile electronic device 100, as understood in the art.

Figure 2:
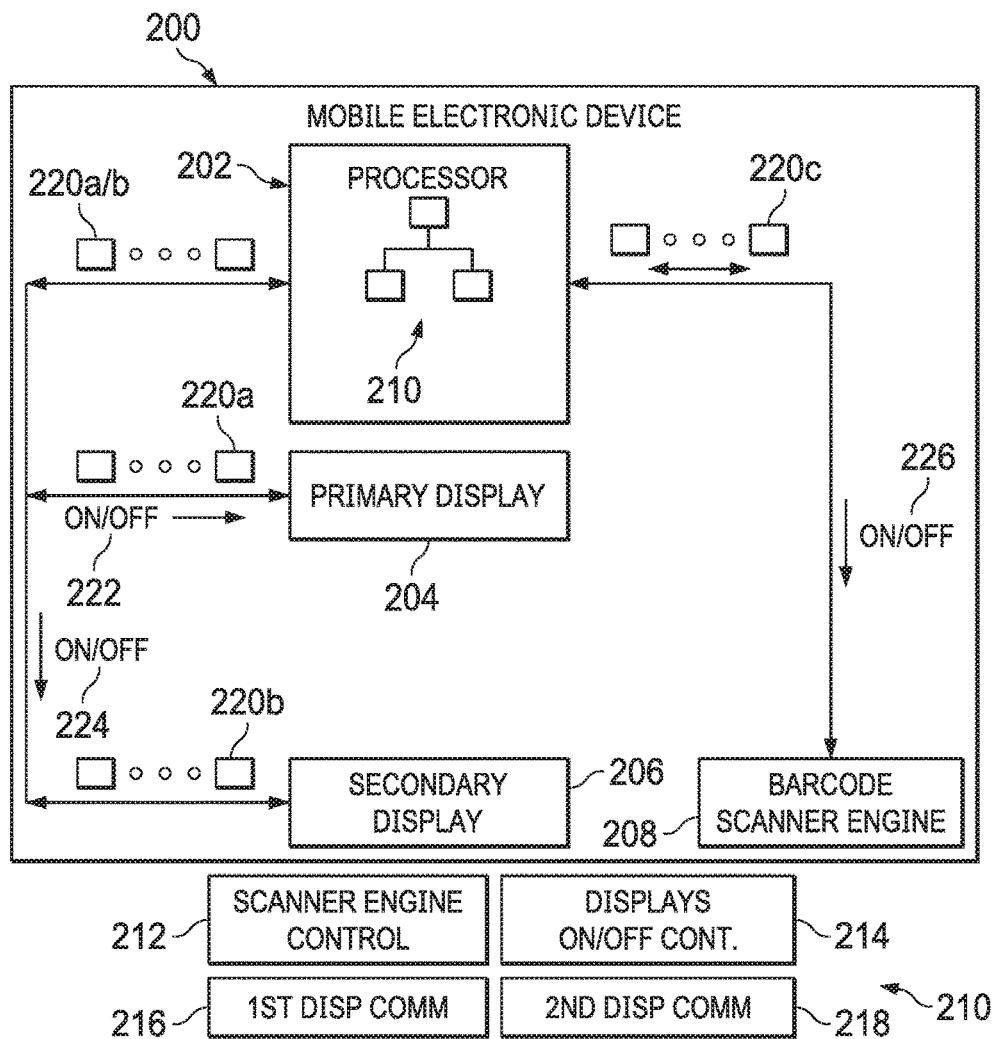
FIG. 2 is a block diagram of an illustrative mobile electronic device including a processor, a primary electronic display or primary display, a secondary electronic display or secondary display, and a barcode scanner engine.

With regard to FIG. 2, a block diagram of an illustrative mobile electronic device 200 including a processor 202, a primary electronic display or primary display 204, a secondary electronic display or secondary display 206, and a barcode or machine-readable indicia scanner engine 208 is shown. The processor 202 may include one or more processing device including one or more processing core that performs logical, mathematical, and/or any other computing operations. The processor 202 may include a general processing unit (GPU), digital signal processor (DPS), image processor, or other processing device. The processor 202 may be formed of any technology, such as an ASIC, EEPROM, and/or any other technology. Memory for storing software and/or data may also be included on the mobile electronic device, as understood in the art, and be usable for performing the machine-readable indicia scanning by the barcode scanner engine 208 and be used for operating the secondary display 206. The barcode scanner engine 208 may be configured with a laser source (not shown) configured to output a laser beam that is used for scanning machine-readable indicia (e.g., barcodes, QR codes, or any other markings capable of being read by a device). The barcode scanner engine 208 may further be configured with an optical sensor configured to receive reflections of the laser beam to capture the machine-readable indicia. The optical may be a light sensor and/or image sensor. Because of the inherent danger of laser beams to human eyes, the user is to avoid having the laser beam be applied directly to her or her eye, such that certain safety control mechanisms are to be employed by the software 210.

The processor 202 is configured to execute software 210 that is configured (i) to manage conventional functionality of a mobile electronic device, and (ii) to perform functions specifically related to controlling and communicating data with the secondary display 206 and barcode scanner engine 208. The conventional functionality may include voice communications, data communications, and any other functionality possible by a mobile electronic device, such as a smart phone, that may include various electronics, such as global positioning system (GPS) electronics, camera, fingerprint scanner, motion sensing electronics, and so on.

The software 210 is shown to include a scanner engine control module 212, displays ON/OFF control module 214, first display communications or control module 216, and second display communications or control module 218. In an embodiment, the modules 214 and 216 may be considered to be a display control module. The scanner engine control module 212 may be configured to control operation of the barcode scanner engine 208. In operation, the scanner engine control module 212 may be configured to control the barcode scanner engine 208 to be enabled/disabled, ON/OFF, and scan a machine-readable indicia. The scanner engine control module 212 may act in coordination with other electronic devices, such as the primary display 206 and primary display 206, as further described herein. The displays ON/OFF control module 214 may be configured to coordinate when the primary display 204 and secondary display 206 are turned ON/OFF. As previously described, the secondary display 206 and barcode scanner engine 208 are to be mutually exclusively turned ON, while the primary display 204 and barcode scanner engine 208 are to be simultaneously activate, as further described herein.

The first display communications module 216 may include software drivers that are used to communicate data 220a to the primary display 204 for displaying text, graphics, windows, images, and/or any other information for conventional software (e.g., mobile apps), and data 220b to the secondary display 206 for displaying textual information, such as text alerts and notifications for conventional software and as related to the barcode scanner engine 208. In general, the data 220b includes standard notifications that are or would otherwise be sent to the primary display 204 for display thereon via data 220a. As provided herein, the secondary display 206 may operate while the primary display 204 is not in an ON state, thereby allowing a user to see the notifications on the secondary display 206. By having the notifications displayed on the secondary display 206 as opposed to the primary display 204, the mobile electronic device 200 may save battery power and the user may reduce or eliminate having to remove the mobile electronic device 200 from his or her belt holder or pocket, for example.

The processor 202 may be electrical communication with each of the primary display 204, secondary display 206, and barcode scanner engine 208. As shown, the processor 202 may communicate control signals and/or data 220a, 220b, and 220c (collectively 220) to and from the primary display 204, secondary display 206, and barcode scanner engine 208. In particular, control signals 222, 224, and 206 may be communicated to each of the primary display 204, secondary display 206, and barcode scanner engine 208 to turn ON/OFF each of the respective devices in accordance with the algorithms described hereinbelow.

In general, since the scanning feature is to be avoided when the secondary display 206 is active, (i) the secondary display 206 is to be switched ON if the following condition is satisfied: (Condition 1) the keyboard is locked, and (ii) the secondary display 206 is to be switched OFF if the following condition is satisfied: (Condition 2) the keyboard is unlocked. The two conditions shall be verified using a software object or module, which in the Android operating system is the KeyguardManager. The KeyguardManager is generally responsible for handling locking/unlocking of the keyboard with a PIN, pattern, face, password lock or default lock (e.g., slide to unlock), and so on. Depending on the supported device inputs, the KeyguardManager handles a lock screen, buttons or keyboard, if any, and other device inputs. The KeyguardManager may also be configured to operate in conjunction with the secondary display 206.

More particularly, the processor 202 may be configured by the software 210 to communicate text alerts and notifications of one or more apps, including to the secondary display 206. The secondary display may be disabled by default, and every time the secondary display 206 is enabled, a disclaimer pop-up shall be accepted by the user so that the user is alerted to not mistakenly look at the secondary display 206 when using the barcode scanner engine 208 and that both will not be simultaneously turned ON.

For the purposes of controlling the secondary display, the KeyguardManager may be configured to perform the following functions:

(i) the keyboard is locked when a user performs a defined action (e.g., power button pressure) and the locked keyboard status persists until the user performs a different action (e.g., keyboard unlocking according to the user settings). The keyboard locking may be performed when the user is not going to interact with the user interface (UI) on the primary display 204 of the mobile device 200; on the contrary, unlocking the primary display 204 of the mobile device is performed when the user is going to interact with the device UI on the primary display 204. Therefore, for the purposes of interacting with the secondary display 206, the same or similar process may be used to working in this status because the user is not using the device UI;

(ii) when the keyboard is locked, scan buttons are not able to start a scanning session by the barcode scanner engine 208, which allows the barcode scanner engine 208 to operate when the secondary display 206 is disabled and switched OFF and the secondary display 206 to operate only when the scanning feature is disabled. Maintaining a mutually exclusive operation of the secondary display 206 and the barcode scanner engine 208 avoids the scanner illuminator from illuminating in the user's eyes while the user is potentially looking at the text being displayed by the secondary display 206.

When the secondary display 206 is switched ON to display content or the secondary display 206 is already switched ON, but the content is to be updated, the secondary display 206 may display fixed content, cutting or not displaying part of text if the text does not fully fit within the secondary display 206 with rolling disabled until a configurable timeout or fixed text timeout expires. After the fixed text timeout is expired, the displayed text may start rolling in order to show to the user the whole text on the secondary display 206 until a configurable timeout or rolling text timeout expires. After the rolling text timeout is expired, the processor 202 may be allowed to transition into a suspend mode. With the processor 202 in the suspend mode, the rolling feature disabling may be accepted and replaced with fixed text. When the processor 202 transitions into the suspend mode, the secondary display 206 may remained turned ON until a configurable timeout or switch off timeout expires. After the switch off timeout is expired, the secondary display 206 may be switched OFF.

A number different embodiments for controlling operation of the secondary display 206 and barcode scanner engine 208 may be provided to enable a user to have both safety and functionality with the mobile electronic device 200.

Figure 4:
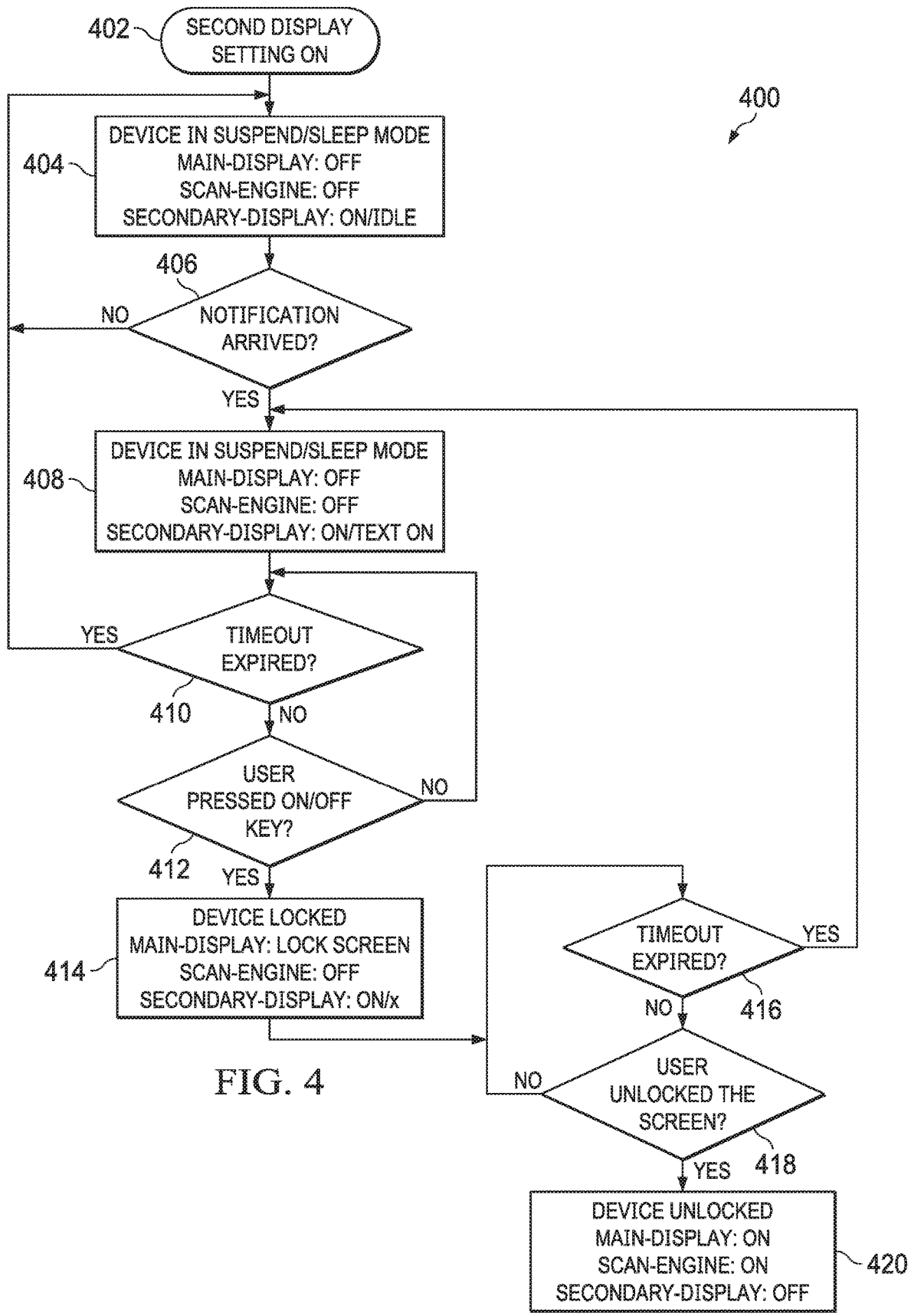
FIG. 4 is an illustration of an illustrative process for controlling operation of a mobile electronic device including multiple displays and a barcode scanner engine, such as provided in FIG. 1B.

An illustrative first embodiment includes the secondary display 206 being disabled by default and enabled by a user explicitly disabling the secondary display 206, when needed. Once enabled, the secondary display 206 may operate, as follows. The secondary display may be switched ON (i.e., transitioned to an ON state) when the primary display 204 is in a locked state, as controlled by an operating system screen lock mechanism, or switched OFF in response to the primary display 204 being transitioned to an unlocked state. In such conditions, in response to the operating system receiving a new notification, the secondary display 206 may receive a message or notification, and the notification may be displayed and persist for a configurable amount of time (e.g., 5 seconds). When the primary display 204 is switched ON and unlocked by the user, the secondary display 206 stops operating and is switched OFF. FIG. 4 provides an illustrative detailed process flow of the first embodiment.

An illustrative second embodiment includes the secondary display 206 being enabled by default, where the secondary display 206 may work, as follows. The secondary display 206 may be switched ON when the primary display 204 is in a locked state, through an operating system screen lock mechanism, or switched OFF in response to the primary display 204 being transitioned to an unlocked state. In such conditions, in response to the operating system receiving a new notification, the secondary display 206 may be updated accordingly and the notification may be displayed thereon for a configurable amount of time. When the primary display 204 is switched ON and unlocked by the user, the secondary display 206 stops operating and will be switched OFF.

An illustrative third embodiment includes secondary display 206 being enabled when sensors (e.g., accelerometer, light sensor, etc.) on the mobile electronic display 200 detecting a specific condition (e.g., vertical position and dark environment, such as being in a pocket). In such conditions, in response to the operating system receiving a new notification, the secondary display 206 may be updated accordingly and the notification may be displayed thereon. If the user does not want to unlock the primary display 204 (e.g., the mobile electronic device 200 remains in his or her pocket), the notification is to be displayed on the secondary electronic display 206 for a configurable amount of time. When the device 200 is handled or moved by the user (i.e., the above conditions are no longer satisfied), the secondary display 206 stops operating and disabled or switched OFF.

Figure 3:
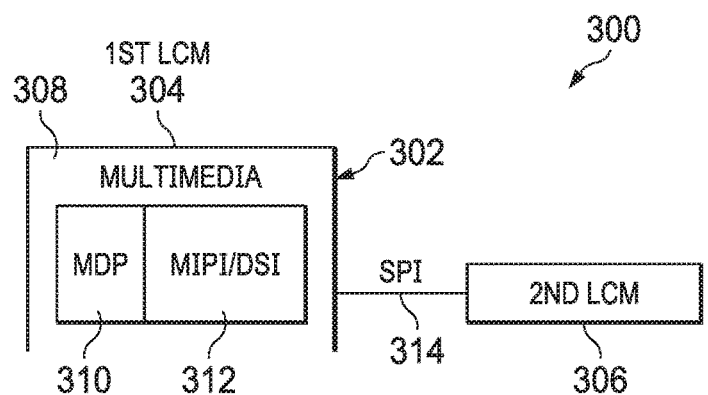
FIG. 3 is an illustration of an illustrative mobile device assembly inclusive of a mobile device including a first display and second display.

With regard to FIG. 3, an illustration of an illustrative mobile device assembly 300 inclusive of a mobile device 302 including a first display 304, such as a liquid crystal monitor (LCM), and second display 306, such as a liquid crystal monitor, is shown. The first LCM 302 may be configured to display multimedia 308, as understood in the art. In displaying the multimedia 308 on the LCM 304, commands and data may be communicated to the LCM via a mini display port (MDP) 310 and/or mobile industry processor interface/digital serial interface (MIPI/DSI) 312. In an embodiment, the second LCM 306 may be in communication with the mobile device 302 via a wired or wireless communications path 314 (e.g., serial peripheral interface (SPI)). It should be understood that a wide range of interface types and communications protocols may be utilized to enable communication of commands and data to either or both of the first and second LCMs 304 and 306.

With regard to FIG. 4, an illustration of an illustrative process 400 for controlling operation of a mobile electronic device including multiple displays and a barcode scanner engine, such as provided in FIG. 1B, is shown. The process 400 may start at step 402, where a secondary display setting may be set to an ON state. By setting the secondary display to an ON state, messages and notifications may be routed to and displayed on the secondary display as opposed to or in addition to the primary display. At step 404, the mobile electronic device may be set to a suspended/sleep mode with the primary display being set to an OFF state, scan engine being set to an OFF state, and secondary display being in an ON/idle state. At step 406, a determination may be made as to whether a message or notification has been received by the mobile electronic device. The notification may be any number of notifications, such as a text message, alert from a mobile app, alarm, or otherwise.

If a determination is made at step 406 that a notification has not been received, then the process may return to step 404. Otherwise, if a notification has been received, then the process may continue to step 408, where the device remains in suspend/sleep mode, and the primary display remains in an OFF state, the scan engine remains in an OFF state, and the secondary display, which is in an ON state, outputs text associated with the received notification. The text ON state may remain active for a configurable amount of time, and at step 410, a determination may be made as to whether a timeout has expired. If the timeout has expired, then the process may return to step 404. Otherwise, if the timeout has not expired, then the process continues to step 412, where a determination as to whether the user has pressed an ON/OFF key may be determined. If the user has not pressed an ON/OFF key, then the process may return to step 410. Otherwise, the process continues to step 414, where the device remains in a locked state such that the primary display is in a lock screen, the scan engine is in an OFF state, and the secondary display is in an ON state—the state of the text being displayed or not displayed may not be a factor.

At step 416, a determination as to whether a timeout has occurred may be made. If a timeout has not been made, then the process continues to step 418, where a determination is made as to whether the user has unlocked the primary display. If the user has not unlocked the primary display, then the process 400 returns to step 416. If the user has unlocked the primary display at step 418, then the process continues to step 420, where the mobile electronic device is unlocked, with the main display being turned to an ON state, the scan engine being set to an ON state, and the secondary display being turned to an OFF state. If, at step 416, a timeout has expired, then the process 400 returns to step 408.

Figure 5:
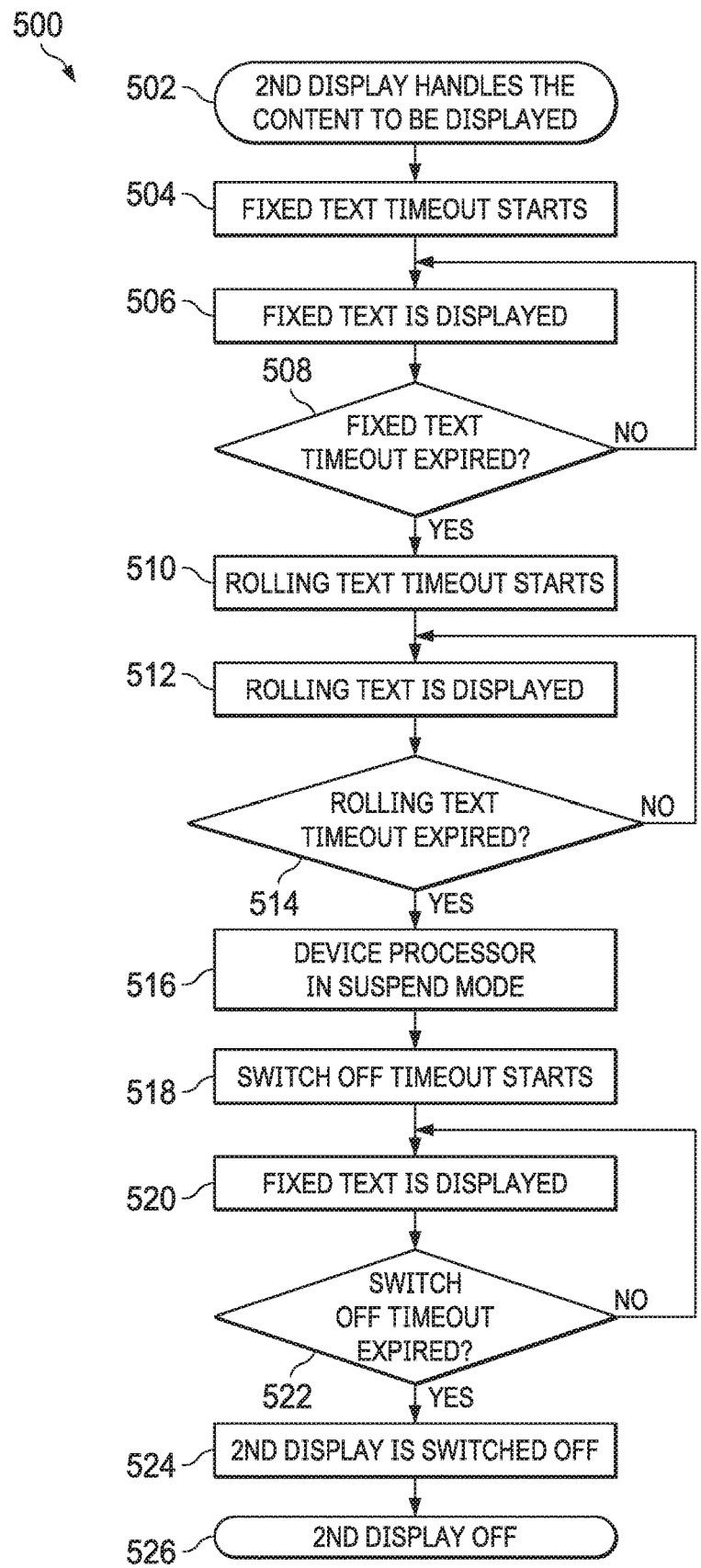
FIG. 5 is an illustration of an illustrative processes for a mobile device to control a secondary display and presenting text on the secondary display, as shown in FIG. 1B.

With regard to FIG. 5, an illustration of an illustrative processes for a mobile device to control a secondary display and presenting text on the secondary display, as shown in FIG. 1B. The process 500 may start at step 502, where the secondary display is configured to receive and display content. At step 504, a fixed text timeout countdown is initiated, where the fixed text timeout may be a short time duration, such as 3 or 5 seconds. At step 506, the text may be displayed, and a determination at step 508 may be made as to whether the fixed text timeout has expired. If the fixed text timeout has not timed out, the process 500 returns the step 506 to continue displaying the fixed text. Otherwise, if the fixed text timeout has expired, the process 500 may continue at step 510, where a rolling text timeout countdown may start. The rolling text may be displayed at step 512. Rolling text may include scrolling text to the left to show more text than may be displayed on a single line of the secondary display.

The process 500 may continue at step 514, where a determination may be made as to whether the rolling text timeout has expired. If not, then the process returns to step 512 to continue rolling the text. Otherwise, the process continues at step 516, where the mobile device processor may be set in a suspend mode. At step 518, a switch off timeout countdown may start that, when expired, causes the secondary display to switch OFF. At step 520, the same or different fixed text may be displayed. At step 522, a determination may be made as to whether the switch off timeout has expired. If not, then the fixed text may continue being displayed at step 520. Alternatively, if the switch off timeout has expired, then the process may continue at step 524, where the secondary display may be switched OFF. The secondary display is turned OFF at step 526.

Figure 6:
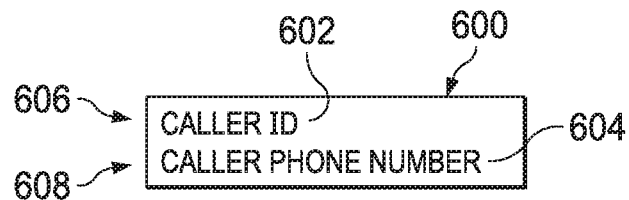
FIG. 6 is an illustrative secondary display of a mobile device on which a caller ID and caller telephone number extracted from a call is displayed.

With regard to FIG. 6, an illustrative secondary display 600 of a mobile device on which a caller ID 602 and caller telephone number 604 extracted from a call is displayed is shown. In response to an incoming call, a caller ID module may be configured to extract or otherwise access caller ID 602 and telephone number data 604 for display on the secondary display 600. In an embodiment, during an incoming call, the caller ID 602 may be displayed on a first line 606 and the phone number 604 may be displayed on a second line 608 of the secondary display 602. The caller ID and caller telephone number may be displayed as fixed text initially, then as rolling text, and finally as fixed text, as previously described with regard to FIG. 5.

More specifically, the secondary display 600 may show incoming call information, if (condition 1—keyboard locked) while the device is receiving an incoming call. The secondary display 600 and/or software being executed by the processor controlling the secondary display 600 may remove the incoming call information from being displayed on the secondary display 600 when the mobile device stops ringing because the incoming call is finished, which means that the incoming call is refused or is taken by the user. In an embodiment, the lifetime of information related to the incoming call shown on the secondary display 600 may be the same information that is or would otherwise be shown on the primary display of the mobile electronic device.

The incoming call notifications have higher priority than the other information being displayed or to be displayed on the secondary display 600. Therefore, when the mobile electronic device receives an incoming call, the secondary display 600 is to show the incoming call information independently from information that was displayed prior to receiving the incoming call. When the incoming call information is removed, the secondary display 600 or software controlling the secondary display 600 is to restore a previous state of information that had been displayed. Therefore, if the secondary display 600 was showing some content before the incoming call was received, the secondary display 600 is to restore the previously shown content. If the secondary display 600 was switched OFF before the incoming call was received, the secondary display 600 is to be switched OFF again when the incoming call information is removed. In order to restore content that was being displayed prior to receiving an incoming call, when an incoming call is received, the information currently being displayed is to be stored before updating the secondary display 600 with the incoming call information.

Figure 7:
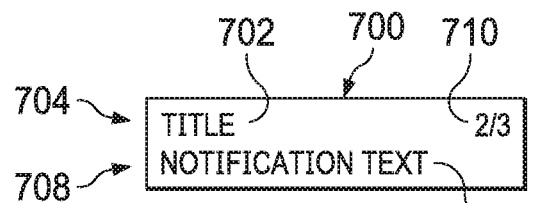
FIG. 7 is a standard preview pop-up of a notifications system of an operating system, such as the Android operating system, for displaying pop-up information on a secondary display.

With regard to FIG. 7, a standard preview pop-up of the Android notifications system may be used for displaying pop-up information on a secondary display 700. As shown, a title 702 may be displayed on a first line 704 and notification text 706 may be displayed on the second line 708 of the secondary display 700. Also displayed on the first line 704 is a notification number 710, in this case notification 2-of-3 or ⅔. In an embodiment, the notifications may be displayed on both the primary display (not shown) and secondary display 700 of the mobile electronic device. In the event that the user reads and deletes the notification on the primary display, the notification may be removed from being displayed or available for display on the secondary display 700. It should be understood that the secondary display and process used for displaying notifications and caller IDs may be performed on other operating systems using the same or similar processes and controls.

Figure 8:
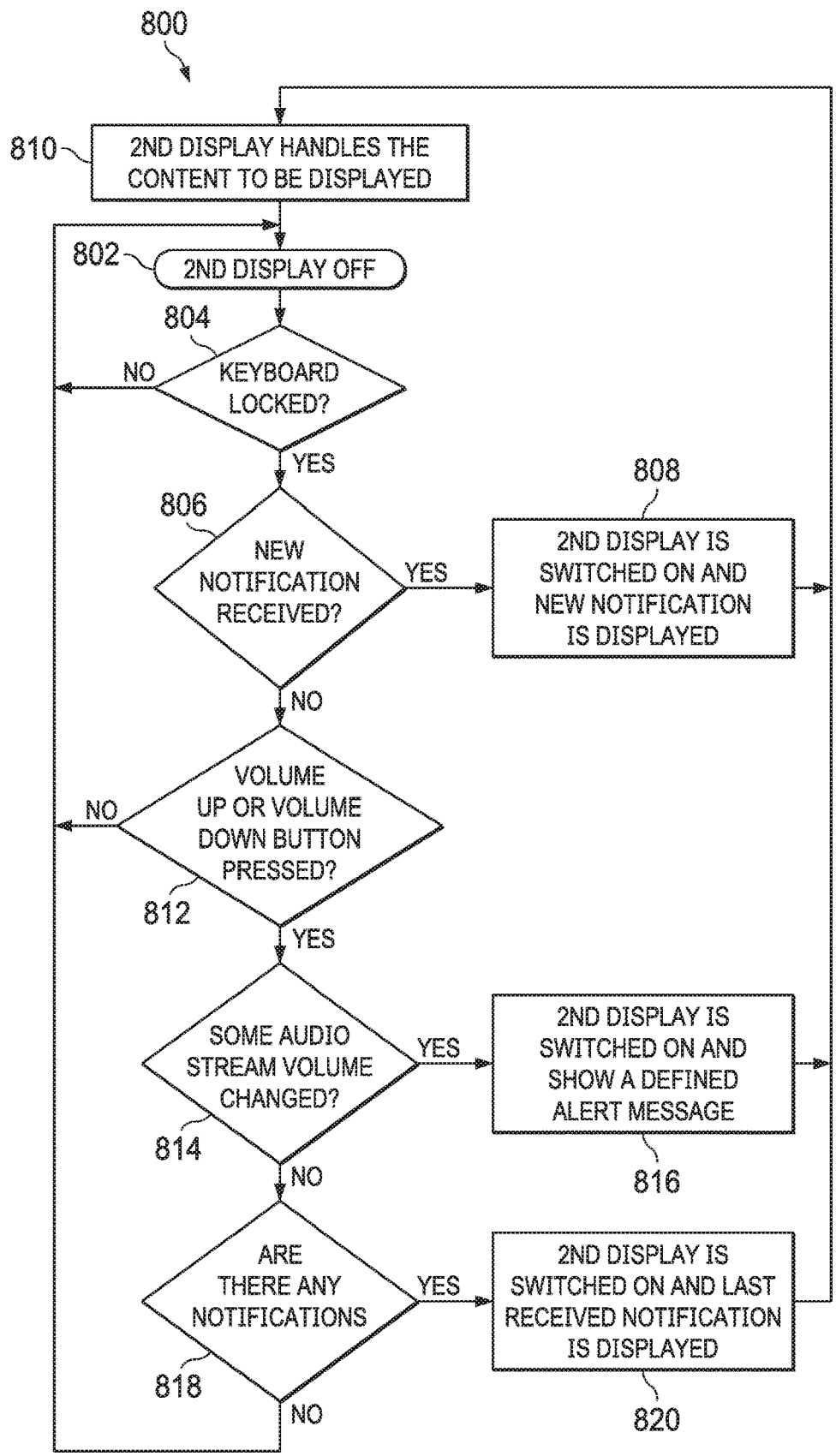
FIG. 8 is a flow diagram of an illustrative process for displaying a notification message on the secondary display.

With regard to FIG. 8, a flow diagram 800 of an illustrative process for displaying a notification message on the secondary display is shown. The secondary display may be in an OFF state at step 802. At step 804, a determination may be made as to whether the keyboard is locked (condition 1). If not, the process 800 returns to step 802. Otherwise, the process 800 continues to step 806, where a determination may be made as to whether a new notification is received. If a determination that a new notification, which is not a telephone call, is being received, then the process 800 may continue at step 808, where the secondary display may be switched ON and new notification may be displayed thereon. The secondary display thereafter handles the content to be displayed at step 810. Thereafter, the process 800 returns to step 802.

At step 812, when the secondary display is switched OFF and a new notification is determined to be received at step 806, a determination may be made as to whether a user element (e.g., volume up or down button) is pressed. If no user interface element is being pressed, then the process may return to step 802. Otherwise, if a user interface element is determined to be pressed at step 812, the process may continue to step 814, where a determination may be made as to whether a volume control feature to change the audio stream volumes, such as music stream, ring stream, notification stream, alarm stream, etc. If an audio stream volume is changed, then the process may continue to step 816 where the secondary display is switched ON and a defined alert message is shown. The process 800 may continue to step 810. If it is determined at step 814 that no audio stream volume is changed, then a determination may be made at step 818 to determine if any notifications exist. If so, then the process may continue to step 820, where if the secondary display is turned OFF (condition 2), then the secondary display may be switched ON and a last received notification may be displayed. The process 800 may continue at step 810. If, at step 818, no notifications exist, then the process 800 may continue to step 802.

As an example, the user may be listening music with an app in the background with the mobile electronic device being locked and the primary display switched off. At the same time, the user may want to read some previously received notifications on the secondary display. To do so, the user may press a user interface element, such as the volume up button or volume down button, to switch the secondary display to an ON state. In this case, the volume up/down button pressure for switching the secondary display to an ON state may also change the music stream audio while the user is listening music. This side effect may be annoying for users, so to help avoid the side effect of the volume changing, the user may be discouraged to control the secondary display while volume buttons are able to change some audio stream volumes. Other user interface button(s) may be utilized to avoid this situation, including configuring the software to respond to the first volume button press, but not an opposite volume button press. Finally, in this condition, the previous defined text message shall be shown on the secondary display to explain to the user why the secondary display is not responding to the user commands and to avoid that response to the user elements could be perceived as a device bug by the user.

Figure 9:
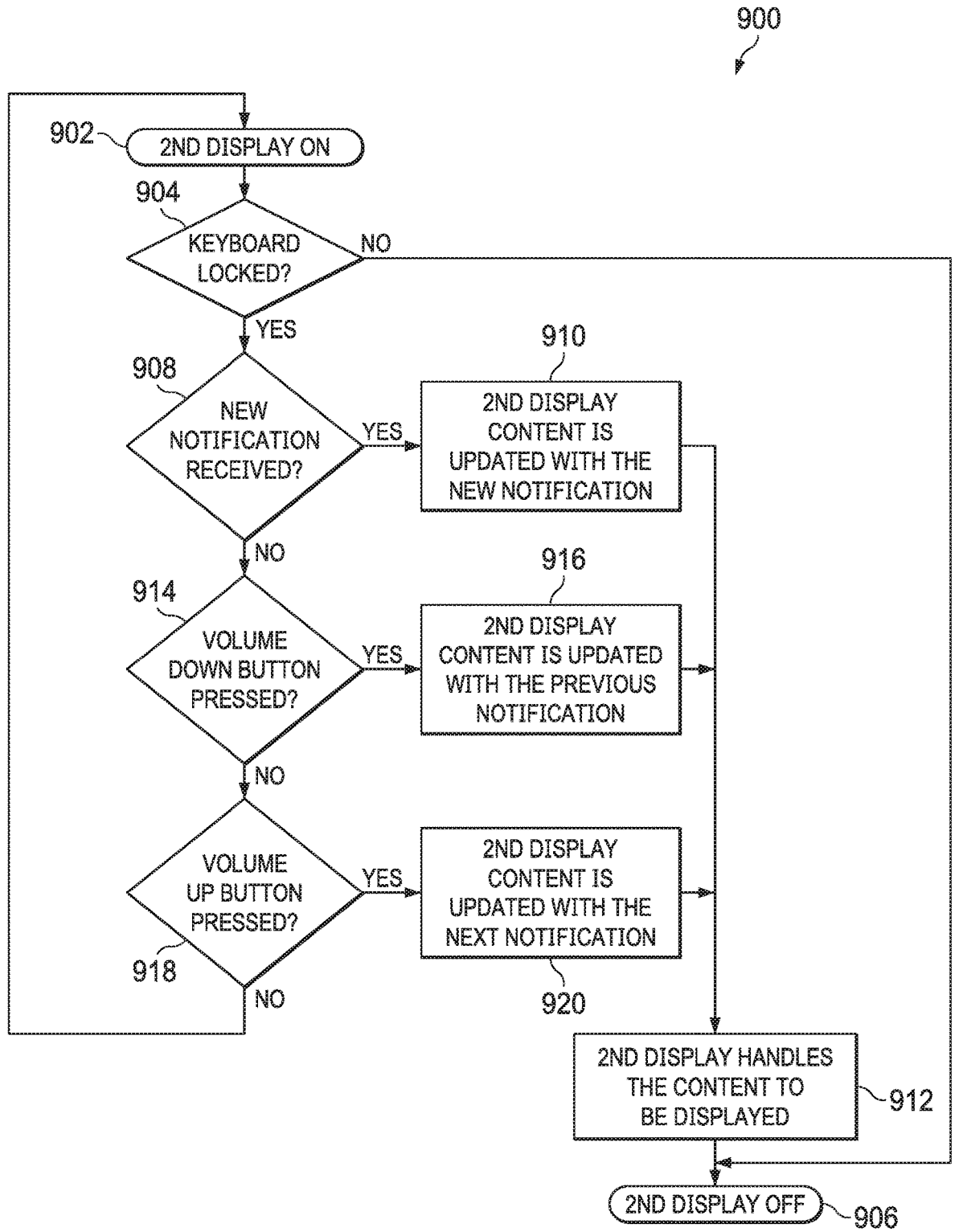
FIG. 9 is a flow diagram of an illustrative process for managing a secondary electronic display when receiving notifications.

With regard to FIG. 9, a flow diagram of an illustrative process for managing a secondary electronic display when receiving notifications is shown. The process 900 may start at step 902, where a secondary display may be in an ON state. At step 904, a determination may be made as to whether the keyboard is locked. If not, then the process 900 continues at step 906, where the secondary display may be turned to an OFF state after a configurable time period, as previously described. Otherwise, if the keyboard is determined to be in a locked state while the secondary display in an ON state, the process continues at step 908, where a determination is made as to whether a new notification is received. If a new notification is received while the keyboard is locked and the secondary display is in an ON state, then the process 900 continues to step 910, where content of the new notification may be used to update the content being displayed by the secondary display. The process 900 may continue at step 912, where the secondary display handles the content to be displayed. Thereafter, as previously described, the secondary display may be transitioned to an OFF state after a time period at step 906. If, at step 908, a new notification has not been received, then the process may continue at step 914, where a determination may be made as to whether a volume down button (or other button) has been pressed. If so, then the process may continue at step 916, where content being displayed on the secondary display may be updated with the previous notification (i.e., to display an historical message). The process may continue at step 912, where the secondary display handles the content to be displayed. If a determination is made at step 914 that the volume down button has not been pressed, then a determination may be made as to whether a volume up button was pressed at step 918. If so, then the process 900 may continue at step 920, where the secondary display content is updated with the text notification. The process may continue thereafter at step 912. If, however, it is determined at step 918 that the volume up button was not pressed, then the process returns to step 902.

With regard to the secondary display, each application running in the mobile device may be configured by the user as enabled or disabled. Notifications received from enabled applications may be displayed, while notifications received from applications that have been disabled may not be displayed.

The maximum length of the notifications number field may be 5 characters, so that the maximum number of unread notification will be 99. When the maximum number of unread notifications is exceeded, the number of unread notification may be displayed with the symbol "+". The following examples show how to manage the possible cases:
 (i) "3/9" in the case of less than 99 notifications;
 (ii) "3/78" in the case of less than 99 notifications;
 (iii) "12/99" in the case of less than 99 notifications;
 (iv) "5/+" in the case of more than 99 notifications;
 (v) "674" in the case of more than 99 notifications;
 (vi) "105/+" in the case of more than 99 notifications;

The secondary display may not group standard notifications as the primary display groups notifications. Operating system standard notifications may be shown as a single notification on the secondary display, even if the displayed notifications are related to the same App and are grouped on primary display.

Figure 10:
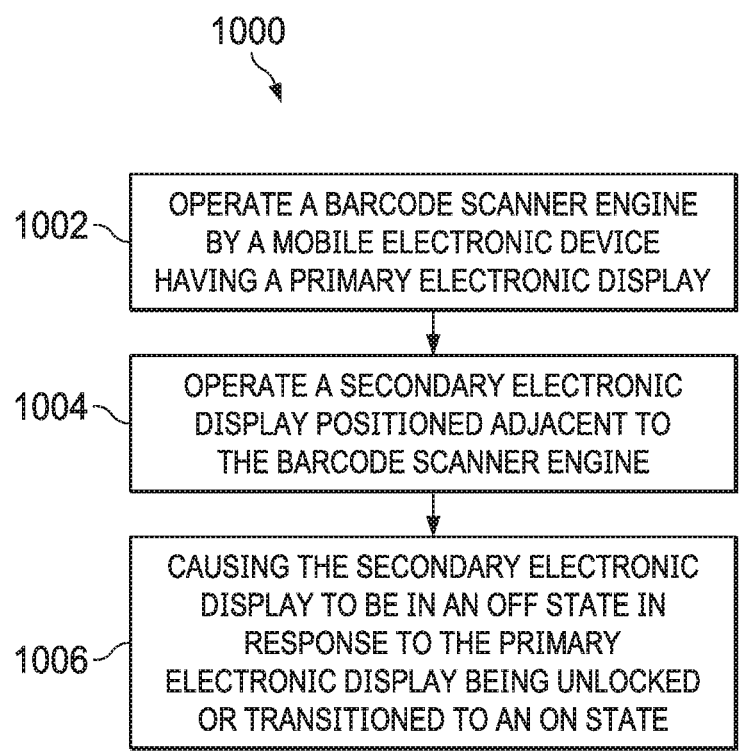
FIG. 10 is a flow diagram of an illustrative process for operating a mobile device including a secondary electronic display and barcode scanner engine.

With regard to FIG. 10, a flow diagram of an illustrative process 1000 for operating a mobile device including a secondary electronic display and barcode scanner engine is shown. The process 1000 may start at step 1002, where a barcode scanner engine of a mobile electronic device that includes a primary electronic display may be operated. A secondary electronic display positioned adjacent to the barcode scanner engine may be operated at step 1004. At step 1006, in response to the primary electronic display being unlocked or transitioned to an ON state, the secondary electronic display may be caused to be in an OFF state because the barcode scanner engine may be active only when the primary display is in the ON state.

The process may further enable the secondary electronic display to be in an ON state when the primary electronic display is in a locked or an OFF state. In an embodiment, messages may be received from one or more applications being executed by the mobile electric device; and be displayed on the secondary electronic display. Messages may be queued for display on the secondary electronic display. A user may be enabled to scroll through the messages in response to the user activating one or more user-interface elements of the mobile electronic device. The process may further include automatically turning OFF a displayed message after a set period of time.

In an embodiment, a condition may be detected from an onboard sensor of the mobile electric device, and the secondary electronic display may be caused to be enabled in response to detecting the condition. Controlling operation of the barcode scanner engine may include causing the barcode scanner engine to be an OFF state when the primary electronic display is not in an ON or unlocked state. In response to a user touching the secondary electronic display, the barcode scanner engine may be triggered to perform a barcode scan.

Another embodiment of a process may include operating a secondary electronic display of a mobile device that includes a machine-readable indicia scanner engine and a primary electronic display. A machine-readable indicia scanner engine may be operated by the mobile device. In response to the machine-readable indicia scanner engine being transitioned to an ON state, the secondary electronic display may be caused to be in an OFF state.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed is:

1. A mobile electronic device, comprising:
   a primary electronic display;
   a scanner engine including an optical sensor configured to capture light reflected from a machine-readable indicia to be used in reading the machine-readable indicia;
   a secondary electronic display positioned adjacent to the scanner engine; and
   a processor operably coupled with the primary electronic display, the secondary electronic display, and the scanner engine, wherein the processor is configured to execute a display control module that ensures the secondary electronic display is in an OFF state when the scanner engine is in an ON state.

2. The device according to claim 1, wherein the display control module further causes the secondary electronic display to be in an OFF state when the primary electronic display is in an unlocked or ON state, and causes the secondary electronic display to be in an ON state when the primary electronic display is in a locked or OFF state.

3. The device according to claim 1, wherein the display control module is further configured to:
receive messages from one or more applications being executed by the mobile electronic device; and
display a notification of a received message on the secondary electronic display.

4. The device according to claim 3, wherein the display control module is further configured to queue messages for display on the secondary electronic display.

5. The electronic device according to claim 4, wherein the display control module is further configured to enable a user to scroll through the messages in response to the user activating one or more user-interface elements of the mobile electronic device.

6. The device according to claim 2, wherein the display control module is further configured to detect a condition from an onboard sensor of the mobile electric device, and cause the secondary electronic display to be enabled and the scanner engine to be disabled in response to detecting the condition.

7. The device according to claim 1, further comprising a housing configured to support the primary electronic display to form at least a portion of a front face and both the scanner engine and the secondary electronic display to form at least a portion of a top face of the mobile electronic device.

8. The device according to claim 1, wherein the secondary electronic display is touch sensitive, and wherein in response to a user touching the secondary electronic display, the scanner engine being triggered to perform a machine-readable indicia scan.

9. A method, comprising:
operating a secondary electronic display of a mobile device that includes a scanner engine and a primary electronic display;
operating the scanner engine; and
in response to the scanner engine being transitioned from an OFF state to an ON state, causing the secondary electronic display to be in an OFF state.

10. The method according to claim 9, further comprising enabling the secondary electronic display to be in an ON state and the scanner engine to be in an OFF state when the primary electronic display is in a locked or an OFF state, and causing the secondary electronic display to be an OFF state and the scanner engine to be in an ON state when the primary electronic display is in an ON or unlocked state.

11. The method according to claim 10, further comprising:
receiving messages from one or more applications being executed by the mobile electric device; and
displaying a notification of a received message on the secondary electronic display.

12. The method according to claim 11, further comprising queuing messages for display on the secondary electronic display.

13. The method according to claim 12, further comprising enabling a user to scroll through the messages in response to the user activating one or more user-interface elements of the mobile electronic device.

14. The method according to claim 9, further comprising:
detecting a condition from an onboard sensor of the mobile electric device; and
causing the secondary electronic display to be enabled and the scanner engine in response to detecting the condition.

15. The method according to claim 9, further comprising, in response to a user touching the secondary electronic display, triggered the scanner engine to perform a scan of a machine-readable indicia.

16. A method, comprising:
operating a scanner engine located on a top face of a mobile electronic device that includes a primary electronic display located on a front face of the mobile electronic device that is perpendicular to the top face;
operating a secondary electronic display positioned on the top face adjacent to the scanner engine; and
in response to the primary electronic display being unlocked or transitioned to an ON state, causing the secondary electronic display to be in an OFF state and the scanner engine to be in an ON state.

17. The method according to claim 16, further comprising in response to the primary electronic display being unlocked or transitioned to an OFF state, causing the scanner engine to being in an OFF state and the secondary electronic display to be in an ON state.

18. The device according to claim 7, further comprising a cover disposed on the top face that is configured to be physically moved cover or uncover the scanner engine, and wherein the display control module automatically causes the secondary electronic display to be in an OFF state, the primary electronic display to be in an ON state, and the scanner engine to be in an ON state responsive to the cover being moved to uncover the scanner engine.

19. The device according to claim 2, wherein the scanner engine includes an illumination device that is enabled when the scanner engine transitioning is an ON state, and disabled when the scanner engine transitioning is an OFF state.

20. The device according to claim 18, wherein the illumination device is a laser element.

* * * * *